US010634257B2

(12) United States Patent
Grödl et al.

(10) Patent No.: US 10,634,257 B2
(45) Date of Patent: Apr. 28, 2020

(54) PROPORTIONAL VALVE

(71) Applicant: HOERBIGER AUTOMATISIERUNGSTECHNIK HOLDING GMBH, Altenstadt (DE)

(72) Inventors: Marcus Grödl, Altdorf (DE); Jochen Schaible, Altensteig (DE); Daniel Haller, Stuttgart (DE); Max Schrobenhauser, Peiting (DE); Collin Dymel, Stuttgart (DE); Benedikt Hildebrandt, Filderstadt (DE); György Molnar, Waldenbuch (DE); Sebastian Neiss, Stuttgart (DE)

(73) Assignee: HOERBIGER FLOW CONTROL GMBH, Altenstadt (DE)

( * ) Notice: Subject to any disclaimer, the term of this patent is extended or adjusted under 35 U.S.C. 154(b) by 50 days.

(21) Appl. No.: 16/100,465

(22) Filed: Aug. 10, 2018

(65) Prior Publication Data
US 2018/0347713 A1 Dec. 6, 2018

Related U.S. Application Data

(63) Continuation of application No. PCT/EP2017/052983, filed on Feb. 10, 2017.

(30) Foreign Application Priority Data

Feb. 11, 2016 (DE) .................. 10 2016 102 389

(51) Int. Cl.
*F16K 31/128* (2006.01)
*F16K 11/16* (2006.01)
(Continued)

(52) U.S. Cl.
CPC ........ *F16K 11/161* (2013.01); *F15B 13/0438* (2013.01); *F16K 31/006* (2013.01);
(Continued)

(58) Field of Classification Search
USPC ...................................... 137/596.14, 596.18
See application file for complete search history.

(56) References Cited

U.S. PATENT DOCUMENTS 2,850,330 A 9/1958 Andrews
3,575,190 A * 4/1971 Puster ...................... F15C 3/04
137/85

(Continued)

FOREIGN PATENT DOCUMENTS

DE 102012017713 A1 3/2014
EP 0943812 A1 9/1999
(Continued)

OTHER PUBLICATIONS

International Search Report issued for corresponding International Application No. PCT/EP2017/052983 dated Apr. 5, 2017.

*Primary Examiner* — John Fox
(74) *Attorney, Agent, or Firm* — Myers Wolin, LLC

(57) ABSTRACT

A proportional valve is provided wherein the valve has an actuating element, a compressed-air connection, a working connection, and an air-removal connection. The valve also has three valve elements arranged one after the other and each can be moved in an axial direction. A first valve element is actuated by the actuating element, a second valve element is actuated by the first valve element, and a third valve element is actuated by the second valve element. In a base position, the valve elements are spaced apart, and, within the valve, a first sealing seat effective between the first valve element and the second valve element and a second sealing seat effective between the third valve element and the housing are arranged such that by varying the position of the first valve element, different switching states can be set.

18 Claims, 2 Drawing Sheets

(51) Int. Cl.
  *F16K 31/42*      (2006.01)
  *F16K 37/00*      (2006.01)
  *F16K 31/00*      (2006.01)
  *F15B 13/043*     (2006.01)

(52) U.S. Cl.
  CPC .......... *F16K 31/128* (2013.01); *F16K 31/423* (2013.01); *F16K 37/0033* (2013.01); *F15B 2211/8855* (2013.01); *Y10T 137/87225* (2015.04)

(56) References Cited

U.S. PATENT DOCUMENTS

| | | | | |
|---|---|---|---|---|
| 3,654,958 | A | * | 4/1972 | Bitonti ................ F15B 13/0402 137/596.14 |
| 3,836,116 | A | * | 9/1974 | Noiles .................. F16K 31/383 251/174 |
| 6,173,744 | B1 | | 1/2001 | Frisch et al. |
| 2009/0309052 | A1 | | 12/2009 | Kresse et al. |
| 2015/0177740 | A1 | | 6/2015 | Haller et al. |
| 2015/0177741 | A1 | | 6/2015 | Haller et al. |

FOREIGN PATENT DOCUMENTS

| | | |
|---|---|---|
| EP | 1146268 A2 | 10/2001 |
| EP | 1832950 A1 | 9/2007 |

\* cited by examiner

PROPORTIONAL VALVE

CROSS REFERENCE TO RELATED APPLICATIONS

This application is a continuation under 35 U.S.C. § 120 of International Application PCT/EP2017/052983, filed Feb. 10, 2017, which claims priority to German Application No. 10 2016 102 389.2, filed Feb. 11, 2016, the contents of each of which are incorporated by reference herein.

FIELD OF THE INVENTION

The present invention relates to a proportional valve, especially to actuation of a pneumatic fitting, wherein the valve has an actuating element, a compressed-air port for connection of a compressed-air supply, a working port and a vent port.

BACKGROUND

Such valves are known in diverse ways from the prior art. In the capacity of a proportional valve, it must be suitable for making available, at the working port provided for connection of the pneumatic fitting, a (an air) pressure that can be regulated as precisely as possible. For this purpose, various valve positions are typically approached by appropriate actuation of the valve by means of the actuating element, in order optionally to couple the working port fluidically with the compressed-air supply or with the vent or (in order to maintain a pressure prevailing at a working port) to decouple it from both. In this connection, intermediate positions between complete air admission and complete venting of the fitting connected to the working port should also be possible in the capacity of a proportional valve.

For clarification, it must be mentioned that any actuators capable of being actuated pneumatically, and therefore especially also a pneumatic drive, are to be understood as a pneumatic fitting in the present context.

Proportional valves of the type mentioned in the foregoing are relatively complex in their design and their operation.

In this connection, the prior art frequently utilizes so-called slide valves, in which at least one linearly displaceable valve element, depending on its position, either opens or closes (completely or partly) an opening disposed laterally relative to the valve element and influencing the flow of air. In contrast to poppet valves, however, for lack of a sealing seat that effectively blocks the flow of fluid, detrimental leakage, which the present disclosure aims advantageously to keep as small as possible or to prevent entirely, must always be expected here for precise application situations.

Beyond this, a proportional valve of the class in question is already known from DE 10 2012 017 713 A1. It has the form of a position controller, in which a power stage (actuated by a preliminary stage functioning as an actuating element) comprises, as a pressure-displacement transducer, two spring-preloaded poppet valves, which are pressurized from a common control chamber and which are sequentially actuated in order to realize various switched states upon increase of the pressure prevailing in the control chamber. Because of the poppet valves to be disposed therein on various sides of the common control chamber, the position controller described in DE 10 2012 017 713 A1 needs a not inconsiderable installation space, which the present disclosure intends to further reduce.

From U.S. Pat. No. 2,850,330, a valve group provided for use in a brake system for tractors with trailers is known in which, by realization of two valves, three valve elements in total are provided that are connected in series, are respectively movable in an axial direction and are positionable in cascade-like manner. By means of the first valve, it is now optionally possible to vent a first working port for the brake system of the trailer or optionally to place it in communication with a compressed-air port on the tractor side, while by means of the second valve it is optionally possible to vent a second emergency working port for the brake system of the trailer or to place it in communication with a second emergency compressed-air port on the tractor side. During variation of the position of the first valve element, a transition takes place there from a first switched state, in which the respective working port is vented, respectively to a second switched state, in which the respective working port is in communication with the compressed-air port on the tractor side.

SUMMARY

Against this background, it is an object of the present disclosure to provide an improved proportional valve of the type mentioned in the introduction, which in particular needs the smallest possible (lateral) installation space and in this context can be operated as reliably and precisely as possible.

This object may be achieved by a proportional valve in accordance with this disclosure. Preferred configurations of such a valve will become apparent from the claims and the description hereinafter.

The described valve is characterized, besides the features mentioned in the introduction, in that the valve has three valve elements connected in series and respectively movable in an axial direction, namely a first valve element actuated by the actuating element,
a second valve element, which is actuated by the first valve element, and
a third valve element, which is actuated by the second valve element, wherein, in a basic position of the valve, the first valve element is spaced apart from the second valve element and the second valve element from the third valve element and, within the valve, a first sealing seat acting between the first valve element and the second valve element and a second sealing seat acting between the third valve element and the housing are formed and disposed in such a way that, during variation of the position of the first valve element by the actuating element and of the cascade-like positioning of the axial positions of the first, second and third valve elements that can be achieved thereby, various switched states can be set for venting of the working port by placing it in communication with the vent port, for air admission to the working port by placing it in communication with the compressed-air port and for holding a pressure present at the working port by shutting off the working port both from the vent port and from the compressed-air port.

In contrast to the prior art already mentioned in the foregoing, within the scope of the present invention it is therefore not two poppet valves as components of one pressure-displacement transducer each that are actuated by the pressure in a common control chamber, but instead it is cascade-like positioning of the valve elements influencing the fluid flow within the valve that takes place in the present case, because of the fact that the first valve element is actuated by the actuating element and the valve elements connected downstream from the first valve elements are actuated successively—in particular purely mechanically—by the respective upstream valve element. It is evident that, by virtue of the axial direction of actuation for all three valve elements, the installation space needed for such a valve—especially in a direction situated laterally relative to the axial direction of movement of the valve elements—can be particularly compact.

Furthermore, in view of the circumstance that two sealing seats interacting with respectively at least one valve element are realized within the valve, particularly low-leakage or leak-free operation can be assured, which is of great advantage in particular for holding a pressure prevailing at the working port and which keeps the pneumatic energy consumption of the valve at a minimum. Furthermore, such a valve can be operated with particularly high regulation quality in proportional mode. By virtue of the cascade-like positionability of the valve, (any desired) intermediate settings between "full air admission" and "full venting" may be advantageously assumed, which in particular permits achievement of high positioning accuracy during activation of pneumatic fittings or drives.

In this connection, the actuating element of a valve acting on the first valve element in order to actuate it may, in an expedient configuration of such a valve, operate according to a hydraulic, pneumatic or electromechanical principle.

In particular, however, it is of advantage for achievement of the least possible total internal energy consumption (electrically and pneumatically) when the actuating element is formed as a pneumatic pilot valve, which cooperates via a control pressure chamber with the first valve element. In this connection, it is of advantage for a particularly energy-saving mode of operation when the pilot valve comprises a piezo-bending transducer, such as is known, for example, from EP 0 943 812 A1, which discloses a suitable pilot valve.

The described valve may therefore be regarded as a pneumatic position controller with a power stage (especially comprising the three valve elements), wherein the first valve element is actuated by the pilot valve functioning as the actuating element. The pilot valve may be configured particularly advantageously as a (proportional) 3/2-way valve.

In a preferred improvement, it may then be further provided in a valve that the first valve element is formed by a diaphragm disk with a diaphragm-disk shank that extends in axial direction and is provided with an axial bore, wherein the diaphragm disk is spring-preloaded in a direction pointing toward the control pressure chamber and for positioning of its axial position is in operative connection with a first diaphragm, which is pressurized on one side with the control pressure (regulated by the pilot valve) prevailing in the control pressure chamber.

The control pressure therefore acts via the control pressure chamber side on the first diaphragm, which is then deflected in a manner depending on the differential pressure established between the two sides of the first diaphragm, thus ultimately leading to actuation, i.e. to axial displacement of the first valve element (coupled via the diaphragm disk to the first diaphragm) in the direction of the second valve element.

Furthermore, in a further preferred embodiment of the described valve, it is provided that the second valve element is formed by a valve tappet, which is spring-preloaded in a direction pointing toward the first valve element and which, depending on axial position of the first valve element, is spaced apart from the diaphragm-disk shank or bears thereon, wherein the first sealing seat is formed at a contact face between diaphragm-disk shank and valve tappet. In this connection, a sealing face that, together with a sealing edge, corresponding thereto, of the valve tappet or diaphragm-disk shank forms a sealing seat, is therefore expediently formed either on the side of the (free) end of the diaphragm-disk shank pointing toward the valve tappet or at the end of the valve tappet pointing toward the diaphragm-disk shank.

As regards the third valve element, it is advantageously provided within the scope of the present disclosure that this is formed by a base element, which is spring-preloaded against a second sealing seat in a direction pointing toward the valve tappet and can be lifted from the second sealing seat by axial displacement of the valve tappet that has been brought into contact on the base element.

On the whole, therefore, a cascade-like positionability of the valve is obtained, in which, in a basic position, which is assumed in particular when the control pressure chamber is vented, the first valve element (diaphragm disk with shank) is spaced apart from the second valve element (valve tappet) and the second valve element (valve tappet) is spaced apart from the third valve element (base element). During operation of the valve, the first valve element (diaphragm disk together with shank) is then first displaced by the actuating element against its spring preloading in the direction of the second valve element (valve tappet), until these touch one another in the region of a contact face forming the first sealing seat. During further displacement of the first valve element by the actuating element, the first and second valve elements are then displaced together in the direction of the third valve element, until the second valve element (valve tappet) comes into contact on the third valve element (base element), so that ultimately, in a further process of the valve elements, even the third valve element can be lifted from the second sealing seat, against which it has been spring-preloaded.

In the process, fluidic communication of the working port with the vent port—starting from the basic position—then advantageously exists as long as the first valve element bears sealingly on the second valve element. The switched state assumed starting from this axial position for holding the pressure prevailing at the working port then remains active over a predetermined displacement path (due to the spacing that exists between second and third valve elements in the basic position) until the second valve element comes into contact on the third valve element and the third valve element lifts from the second sealing seat. Then the valve assumes the switched state for air admission to the working port.

In a preferred configuration of the valve, it may be provided that a surface forming the first and/or second sealing seat and/or interacting therewith for adjustment of the leak rate and/or for improvement of the regulation behavior is made of a polymer material, especially having elastic behavior, optionally different from that of the respective sealing partner. In particular, especially fine transitions can be achieved hereby with respect to the intermediate positions needed for proportional operation of the valve.

Within the scope of the invention, it is further preferably provided that the vent port discharges into a continuously vented vent chamber of the valve, which is fluidically in communication with the working port via the axial bore of the diaphragm-disk shank when the diaphragm-disk shank is not bearing on the valve tappet and is fluidically separated from the working port when the diaphragm-disk shank is in sealing contact on the valve tappet.

Moreover, it may be preferably provided that the vent chamber is bounded by the first diaphragm and a second diaphragm, wherein the diaphragm-disk shank (provided with the axial bore) extends with its free end axially through the second diaphragm. Thus—depending on whether the axial bore of the diaphragm-disk shank is open because the valve tappet is spaced apart or is blocked by sealing contact on the valve tappet—fluidic communication between vent chamber and working port may be established or blocked.

Furthermore, it is advantageously provided that a working pressure chamber in communication with the working port of the valve is bounded by the second diaphragm and the second sealing seat, wherein the working pressure chamber, depending on position of the diaphragm disk, of the valve tappet and of the base element, is fluidically in communication with the compressed-air port or the vent port or is separated from the compressed-air port and vent ports.

For spring-preloading of the diaphragm disk and/or of the base element, it proves to be expedient when the spring element or elements preloading the diaphragm disk or disks and/or the base element are respectively braced on a housing of the valve.

Particularly advantageously, it may then be provided that the diaphragm disk is preloaded with at least three spring elements, which are disposed equidistant from an axial central axis of the diaphragm disk (and diaphragm-disk shank), which are offset, in pairs, by the same angle relative to one another and which are braced on the housing of the valve. In the case of three spring elements, therefore, they are advantageously offset by respectively 120° from one another. In the case of four spring elements, this is respectively 90°, and so on.

Furthermore, within the scope of the disclosure, the second diaphragm may also contribute advantageously to the radial bearing of the (axially oriented) diaphragm shank. In a further preferred improvement of the valve, it is therefore provided that the diaphragm disk, especially in the region of the diaphragm-disk shank, is joined to the second diaphragm, wherein the second diaphragm provides radial bearing for the axially oriented diaphragm disk.

As regards the spring-preloading of the valve tappet, it is provided in yet another preferred embodiment of the valve that this is preloaded in the direction of the diaphragm-disk shank by a spring braced on the base element. This has the advantage that, when the valve tappet is already bearing on the base element, the spring element preloading the valve tappet does not have to be compressed further against its spring force for further displacement of all three valve elements. Therefore the spring that preloads the valve tappet then does not contribute to a further increase of the spring force to be overcome during further displacement of the first, second and third valve elements. Hereby the regulation behavior of the valve can therefore be improved even more, since a smaller increase of the control pressure in the control pressure chamber is then needed to lift the third valve element from the second sealing seat than would be the case if the spring of the valve tappet were braced on the housing.

A further preferred configuration of the valve provides that the unactuated valve tappet is distant by a certain displacement path from the base element bearing on the second sealing seat. Hereby, especially the switched state of the proportional valve provided for holding a defined pressure at the working port may be distinguished clearly from the two other switched states for air admission to and venting of the working port, which in turn improves the regulation behavior of the valve.

Furthermore, it proves advantageous within the scope of the disclosure when the spring elements preloading the diaphragm disk, the valve tappet and the base element have spring characteristics that are different and matched to one another, since in this way the regulation behavior of the valve can be adapted particularly well to the respective requirements. From the viewpoint of cascade-like positioning, it is particularly expedient when the spring stiffness of the spring element preloading the base element is greater than the spring stiffness of the spring element preloading the valve tappet and when the spring stiffness of the spring element preloading the valve tappet is greater than that of the spring element preloading the diaphragm disk.

Finally, it may be further provided in a preferred configuration of the present disclosure that the valve has a pressure regulator for setting the pressure present at a pneumatic inlet of the pilot valve, wherein the pressure present at the inlet of the pilot valve may in particular also be branched or drawn from the compressed-air supply to be connected at the compressed-air port.

BRIEF DESCRIPTION OF THE DRAWING

An exemplary embodiment of the invention will be explained in more detail hereinafter on the basis of the drawing, wherein.

DETAILED DESCRIPTION OF THE PREFERRED EMBODIMENTS

Figure 1:
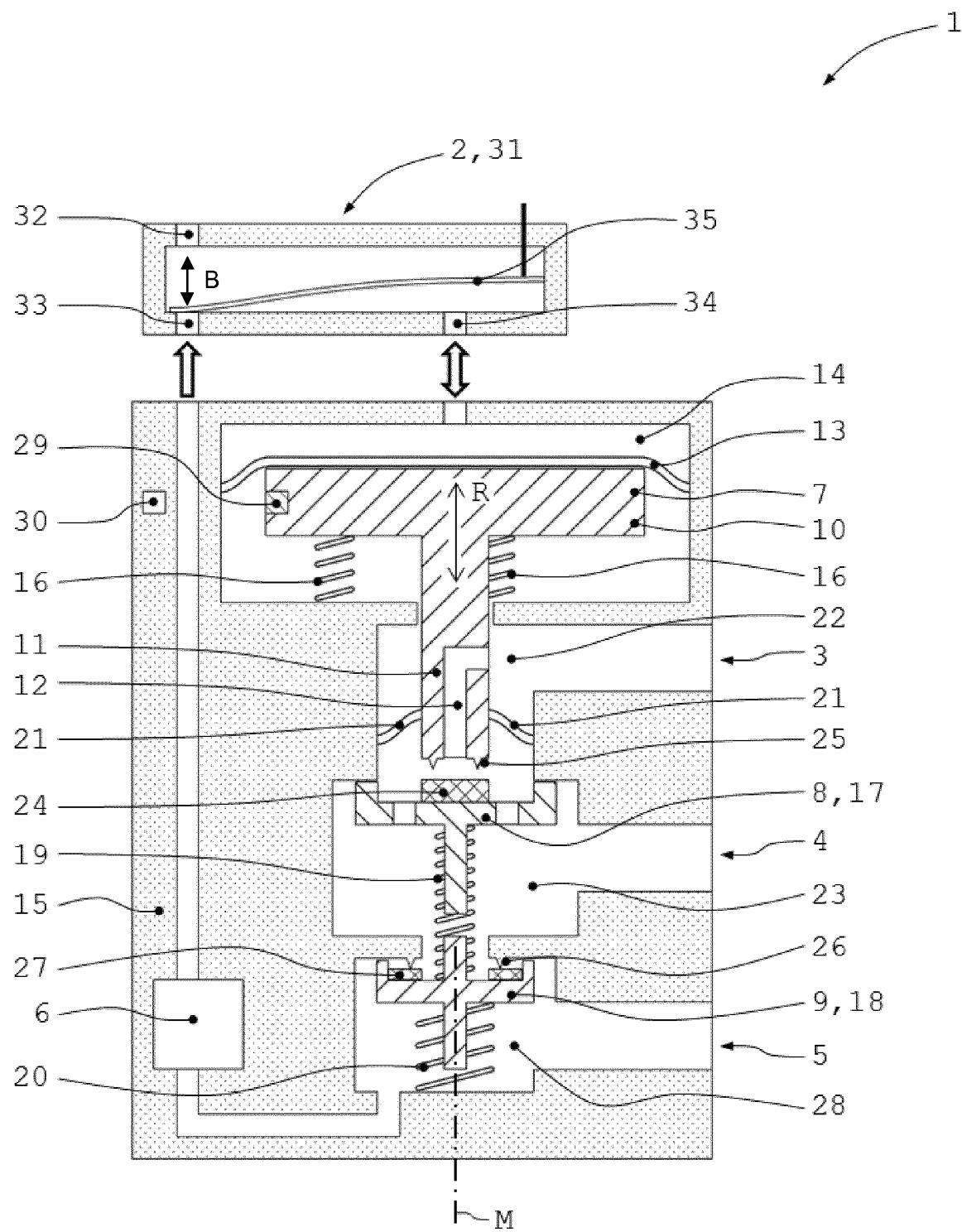
FIG. 1 shows a section through an exemplary embodiment of an inventive valve and FIG. 2 shows a schematic illustration of the arrangement of the spring elements preloading the first valve element in the exemplary embodiment according to FIG. 1.

FIG. 1 shows an exemplary embodiment of an inventive proportional valve 1, which is provided with an actuating element 2 having the nature of a pneumatic pilot valve 31. The structure of this pilot valve 31 will be explained in still more detail hereinafter.

Valve 1 further has a vent port 3, a working port 4 for connection of a pneumatic fitting (not illustrated) to be actuated with valve 1 and a port 5 for a compressed-air supply with a predetermined air pressure of 8 bar, for example. Furthermore, a pressure regulator 6 is provided, with which a pressure of 1.2 bar, for example, which is lower than the pressure prevailing for the compressed-air supply at port 5, can be drawn therefrom as input pressure for the pneumatic pilot valve acting as actuating element 2. Since pressure regulators are known as such in diverse respects in the prior art and their specific configuration is ultimately not relevant for the present invention, a more detailed description of their functional principle will not be provided here.

Valve 1 further has three valve elements 7, 8, 9 connected in series and respectively movable in an axial direction according to double arrow R.

In this connection, first valve element 7 (topmost in FIG. 1) comprises a diaphragm disk 10 and a diaphragm-disk shank 11 with an axial bore 12.

Figure 2:
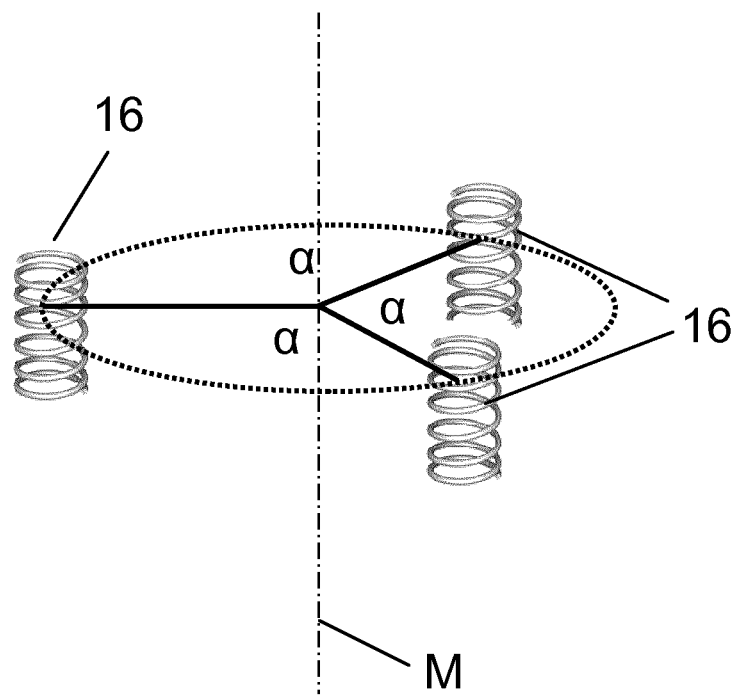

Diaphragm disk 10 is in operative connection (via a mechanical coupling in the present case) with a first diaphragm 13, wherein a control pressure chamber 14 is formed above first diaphragm 13 and diaphragm-disk 10. The air pressure prevailing in control pressure chamber 14 is regulated by pilot valve 31 functioning as actuating element 2. Furthermore, first valve element 7 (formed by diaphragm disk 10 plus diaphragm-disk shank 11) is spring-preloaded in (axial) direction relative to control pressure chamber 14. For this purpose, in total three spring elements (springs) 16 braced on housing 15 of valve 1 are provided in the present exemplary embodiment. Only one of those (left of center axis M) lies in the section plan in FIG. 1, while the other two spring elements (of which only one is visible in FIG. 1) lie in front of or behind the section plane. These three spring elements 16 are respectively disposed equidistant (i.e. with the same radial spacing) from center axis M, and in the plane passing perpendicularly through center axis M are offset, in pairs, by the same angle a of 120° relative to one another (i.e. around center axis M), so that, relative to the axial center axis M, completely symmetric preloading of first valve element 7 in the direction of control pressure chamber 14 is achieved. FIG. 2 illustrates this symmetric arrangement of the total of three spring elements 16 present here.

Second valve element 8 in the present case is formed by a valve tappet 17 and third valve element 9 by a base element 18. In this connection, valve tappet 17 is preloaded in the direction of first valve element 7 (=diaphragm disk 10 and diaphragm-disk shank 11) by means of a spring 19, which is braced on base element 18, while base element 18 in turn is preloaded by means of a spring 20, which is braced on housing 15.

In the basic position of valve 1 illustrated in FIG. 1, all three axially movable valve elements 7, 8, 9 are preloaded in the same direction, but are spaced apart from one another in pairs.

Diaphragm-disk shank 11 is coupled with a second diaphragm 21, which circumferentially surrounds diaphragm-disk shank 11 sealingly and separates (continuously vented) vent chamber 22, which is disposed between first diaphragm 13 and second diaphragm 21 and which leads to vent port 3, from a working pressure chamber 23 leading to working port 4. This second diaphragm 21 may serve simultaneously as radial bearing of the diaphragm-disk shank. By virtue of the spacing present between the free end of diaphragm-disk shank 11 and valve tappet 17 in the basic position of valve 1, working pressure chamber 23 (and thus also a pneumatic fitting connected to working port 4) is vented in the valve position illustrated in FIG. 1.

At its top face pointing toward diaphragm-disk shank 11, valve tappet 17 has a polymer material, which serves sealing face 24 and on which a lower edge 25 of diaphragm-disk shank 11 can come into contact to form a first sealing seat. Depending on the hardness of the polymer, this compliant sealing face permits particularly precise proportional fine regulation during positioning of the valve in the vicinity of the contact area.

When therefore—by appropriate increase of the pressure prevailing in control pressure chamber 14—first valve element 7 is displaced so far that lower edge 25 of diaphragm-disk shank 11 comes sealingly into contact on top face 24 of valve tappet 17, the communication through axial bore 12 of diaphragm-disk shank 11 that existed between vent chamber 22 and working pressure chamber 23 is blocked, whereby the previous venting of working pressure chamber 23 is canceled.

A second sealing seat is formed in the illustrated exemplary embodiment of a valve 1 by a sealing edge 26, which is integral with the housing and in FIG. 1 is pointing downward, and against which base element 18 functioning as third valve element 9 is preloaded by means of spring 20, wherein here a sealing face 27 of a polymer material, interacting with sealing edge 26 to form the second sealing seat, is provided in turn on the base-element side. A pressure supply chamber 28 in communication with port 5 for the pressure supply is situated underneath the second sealing seat, and is therefore separated fluidically from working pressure chamber 23 precisely when base element 18 bears sealingly with its top face on sealing edge 25.

Thus, only when—by suitable actuation of first valve element 7 by means of actuating element 2—first valve element 7 has been displaced so far that first valve element 7 bears on second valve element 8 and second valve element 8 bears on third valve element 9, does a further increase of the control pressure in control pressure chamber 14 cause third valve element 9 (=base element 18) to be lifted from the second sealing seat, whereby working pressure chamber 23 is placed fluidically in communication with the pressure supply. During actuation of third valve element 9, it is of advantage that a hard stop is formed between valve tappet 17 and base element 18.

Last but not least, the particularly good regulation behavior of the described valve is also achieved on the basis of the spacings provided in the basic state between the first, second and third valve elements 7, 8, 9, since hereby the various fluidic states of the valve can be differentiated particularly well and simply activated.

Regulation of such a valve proves—despite the cascade-like configuration—otherwise to be particularly simple. For this purpose, it is possible to provide a magnetic element 29 on first valve element 7 (e.g. in the region of the diaphragm-disk rim), so that, by using a suitable sensor 30, the axial position of first valve element 7 can be determined precisely.

By virtue of the purely mechanical coupling of the three valve elements 7, 8, 9 and because of the fixed travels, predetermined by the location of the sealing seats, between the various valve positions, it is possible to achieve regulation of the valve by utilizing (exclusively) the (axial) position of first valve element 7, which can be determined by means of sensor 30.

Finally, FIG. 1 further shows pneumatic pilot valve 31, which is used as actuating element 2. In the present case, this is configured as a proportional 3/2-way valve.

It has a pressure inlet 33, which in the present case is fed with compressed air made available by pressure regulator 6. Furthermore, a pilot-valve vent port 32 (optionally in communication with vent port 3 of valve 1) is provided, as is a pilot-valve working outlet 34, which is fluidically in communication with control pressure chamber 14 of valve 1. By means of a piezo-bending transducer 35, which can be electrically actuated and hereby swiveled in the region of its free end as indicated by double arrow B, pilot-valve working outlet 34 may now be optionally vented (i.e. placed fluidically in communication with pilot-valve vent port 33) or placed partly or completely in communication with the pressure prevailing at pressure inlet 33 of pilot valve 31. Thus, as already described, pilot valve 31, by regulating the pressure prevailing in control pressure chamber 14, can be used with particularly high regulation quality and low energy consumption as the actuating element for first valve element 7 of valve 1.

What is claimed is:

1. A proportional valve (1), especially for actuation of a pneumatic fitting, wherein the valve (1) has an actuating element (2), a compressed-air port (5) for connection of a compressed-air supply, a working port (4) and a vent port (3), wherein the valve (1) has three valve elements (7, 8, 9) connected in series and respectively movable in an axial direction, namely a first valve element (7) actuated by the actuating element (2), a second valve element (8), which is actuated by the first valve element (7), and a third valve element (9), which is actuated by the second valve element (8), wherein, in a basic position of the valve (1), the first valve element (7) is spaced apart from the second valve element (8) and the second valve element (8) from the third valve element (9) and, within the valve (1), a first sealing seat (25) acting between the first valve element (7) and the second valve element (8) and a second sealing seat (26) acting between the third valve element (9) and the housing (15) are formed and disposed in such a way that, during variation of the position of the first valve element (7) by the actuating element (2) and of the cascade-like positioning of the axial positions of the first, second and third valve elements (7, 8, 9) that can be achieved hereby, various switched states can be set for venting of the working port (4) by placing it in communication with the vent port (3), for air admission to the working port (4) by placing it in communication with the compressed-air port (5) and for holding a pressure present at the working port (4) by shutting off the working port (4) both from the vent port (3) and the compressed-air port (5).

2. The proportional valve of claim 1, wherein the actuating element (2) operates according to a hydraulic, pneumatic or electromechanical principle.

3. The proportional valve of claim 1, wherein the actuating element (2) is formed as a pneumatic pilot valve (31), which cooperates via a control pressure chamber (14) with the first valve element (7) and which preferably comprises a piezo-bending transducer (35).

4. The proportional valve of claim 3, wherein the first valve element (7) is formed by a diaphragm disk (10) with a diaphragm-disk shank (11) that extends in axial direction and is provided with an axial bore (12), wherein the diaphragm disk (10) is spring-preloaded in a direction pointing toward the control pressure chamber (14) and for positioning of its axial position is in operative connection with a first diaphragm (13), which is pressurized on one side with the control pressure prevailing in the control pressure chamber (14).

5. The proportional valve of claim 4, wherein the second valve element (8) is formed by a valve tappet (17), which is spring-preloaded in a direction pointing toward the first valve element (7) and which, depending on axial position of the first valve element (7), is spaced apart from the diaphragm-disk shank (11) or bears thereon, wherein the first sealing seat (25) is formed at the contact face between diaphragm-disk shank (11) and valve tappet (17).

6. The proportional valve of claim 5. Wherein the vent port (3) discharges into a continuously vented vent chamber (22) of the valve (1), which is fluidically in communication with the working port (4) via the axial bore (12) of the diaphragm-disk shank (11) when the diaphragm-disk shank (11) is not bearing on the valve tappet (17) and is fluidically separated from the working port (4) when the diaphragm-disk shank (11) is in sealing contact on the valve tappet (17).

7. The proportional valve of claim 6, wherein the vent chamber (22) is bounded by the first diaphragm (13) and a second diaphragm (21), wherein the diaphragm-disk shank (11) extends with its free end axially through the second diaphragm (21).

8. The proportional valve of claim 7, wherein a working pressure chamber (23) in communication with the working port (4) of the valve (1) is bounded by the second diaphragm (21) and the second sealing seat, wherein the working pressure chamber (23), depending on position of the diaphragm disk (10), of the valve tappet (17) and of the base element (18), is fluidically in communication with the compressed-air port (5) or the vent port (3) or is separated from the compressed-air port (5) and vent port (3).

9. The proportional valve of claim 7, wherein the diaphragm disk (10), especially in the region of the diaphragm-disk shank (11), is joined to the second diaphragm (21), wherein the second diaphragm (21) provides radial bearing for the axially oriented diaphragm disk (10).

10. The proportional valve of claim 5, wherein the unactuated valve tappet (17) is distant by a certain displacement path from the base element (18) bearing on the second sealing seat.

11. The proportional valve of claim 4, wherein the third valve element (9) is formed by a base element (18), which is spring-preloaded against a second sealing seat (26) in a direction pointing toward the valve tappet (17) and can be lifted from the second sealing seat (26) by axial displacement of the valve tappet (17) that has been brought into contact on the base element (18).

12. The proportional valve of claim 11, wherein the valve tappet (17) is preloaded in the direction of the diaphragm-disk shank (10) by a spring (19) braced on the base element (18).

13. The proportional valve of claim 11, wherein the spring elements (16, 19, 20) preloading the diaphragm disk (10), the valve tappet (17) and the base element (18) have spring characteristics that are different and matched to one another.

14. The proportional valve of claim 13, wherein the spring stiffness of the spring element (20) preloading the base element (18) is greater than the spring stiffness of the spring element (19) preloading the valve tappet (17) and in that the spring stiffness of the spring element (19) preloading the valve tappet (17) is greater than the spring stiffness of the spring element (16) preloading the diaphragm disk (10).

15. The proportional valve of claim 4, wherein spring elements (16, 20) preloading the diaphragm disk (10) and/or the base element (18) are respectively braced on a housing (15) of the valve (1).

16. The proportional valve of claim 15, wherein the diaphragm disk (10) is preloaded with at least three spring elements (16), which are disposed equidistant from an axial central axis (M) of the diaphragm disk (10), which are offset, in pairs, by the same angle ($\alpha$) relative to one another and which are braced on the housing (15) of the valve (1).

17. The proportional valve of claim 3, wherein the valve (1) further has a pressure regulator (6) for setting the pressure present at a pneumatic inlet (33) of the pilot valve (31).

18. The proportional valve of claim 1, wherein a surface (24, 27) forming the first and/or second sealing seat and/or interacting therewith for adjustment of the leak rate and/or for improvement of the regulation behavior is made of a polymer material.

* * * * *